(12) United States Patent
Kaga

(10) Patent No.: US 8,095,709 B2
(45) Date of Patent: Jan. 10, 2012

(54) DEVICE NAME EDITING APPARATUS AND DEVICE NAME DISPLAY METHOD

(75) Inventor: Katsumi Kaga, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/475,246

(22) Filed: May 29, 2009

(65) Prior Publication Data

US 2010/0100902 A1    Apr. 22, 2010

(30) Foreign Application Priority Data

Oct. 22, 2008    (JP) ................ 2008-271888

(51) Int. Cl.
- G06F 13/12    (2006.01)
- H04N 7/18    (2006.01)
- G06F 3/00    (2006.01)
- G06F 9/44    (2006.01)

(52) U.S. Cl. ............. 710/62; 725/80; 715/716; 719/328
(58) Field of Classification Search ............ 710/62; 725/80; 715/716; 719/328
See application file for complete search history.

(56) References Cited

U.S. PATENT DOCUMENTS

| | | | |
|---|---|---|---|
| 6,426,800 B1 | 7/2002 | Mizuno et al. | |
| 6,834,374 B1 | 12/2004 | Sameshima | |
| 6,892,350 B1 * | 5/2005 | Oba et al. | 715/716 |
| 2002/0041390 A1 | 4/2002 | Mizuno et al. | |

FOREIGN PATENT DOCUMENTS

| | | |
|---|---|---|
| JP | 5088837 | 4/1993 |
| JP | 2000-197159 | 7/2000 |
| JP | 2001086269 | 3/2001 |
| JP | 2001-119769 | 4/2001 |
| JP | 2002-077171 | 3/2002 |
| JP | 3545912 | 7/2004 |
| JP | 2007-034055 | 2/2007 |
| JP | 2007-036854 | 2/2007 |
| JP | 2008-034976 | 2/2008 |
| JP | 2008-035189 | 2/2008 |
| JP | 2008-035190 | 2/2008 |
| JP | 2008-067261 | 3/2008 |
| JP | 2008-078867 | 4/2008 |
| WO | 2008-013132 A1 | 1/2008 |

OTHER PUBLICATIONS

Japanese Patent Application No. 2008-271888, Notification of Reason for Refusal, mailed Aug. 11, 2009, (English Translation).
Japanese Patent Application No. 2008-271888, Notification of Reason for Refusal, mailed Nov. 4, 2009, (English Translation).
Japanese Patent Application No. 2008-271888, Notification of Reason for Refusal, mailed Feb. 23, 2010, (English Translation).
Japanese Patent Application No. 2008-271888, Notification of Reason for Refusal, mailed Jun. 15, 2010, (English Translation).
Japanese Patent Application No. 2008-271888, Notification of Reasons for Refusal, mailed Aug. 31, 2010, (English Translation).

* cited by examiner

*Primary Examiner* — Hoang-Vu A Nguyen-Ba
(74) *Attorney, Agent, or Firm* — Blakely, Sokoloff, Taylor & Zafman LLP

(57) ABSTRACT

According to an aspect of the invention, a device name editing apparatus includes: a connector to which a device is connected; a display unit configured to display a device name of the device; and a device name editor configured to allow a user to input character information so as to edit the device name to be displayed on the display unit.

7 Claims, 6 Drawing Sheets

DEVICE NAME EDITING APPARATUS AND DEVICE NAME DISPLAY METHOD

CROSS-REFERENCE TO RELATED APPLICATIONS

This application is based upon and claims the benefit of priority from Japanese Patent Application No. 2008-271888, filed Oct. 22, 2008, the entire contents of which are incorporated herein by reference.

BACKGROUND

1. Field

The present invention relates to a device name editing apparatus and a device name display method which control a display name such as a name or a type of a connected apparatus such as a DVD recorder, a PC or an AV amplifier.

2. Description of the Related Art

In recent years, a TV, a DVD, a player and a DVD recorder have spread in a digital apparatus provided with an HDMI (High Definition Multimedia Interface), for example. The HDMI can transfer video and audio digital data through a single cable in a non-compression. When apparatuses in accordance with an HDMI-DEC (Consumer Electronics Control), for example, a TV and a DVD recorder are connected to each other through the HDMI, it is possible to operate the DVD recorder connected to the TV by using a remote controller of the TV by an HDMI-CEC function.

For example, an HDMI compatible TV includes a plurality of HDMI terminals and can be connected to a plurality of apparatuses at the same time. It is assumed that the HDMI compatible TV includes three HDMI terminals having an HDMI 1, an HDMI 2 and an HDMI 3, and the TV is connected to three external apparatuses including DVD recorders 1, 2 and 3 through three HDMI terminals.

In this case, the HDMI 1 and the HDMI 2 are displayed on a TV screen, for example. When the HDMI 1 displayed on the TV is selected by a remote controller operation of a user, the TV screen is switched into an output display from the DVD recorder 1 connected to the HDMI terminal corresponding to the HDMI 1. When the HDMI 2 displayed on the TV is selected by the remote controller operation of the user, similarly, the TV screen is switched into an output display from the DVD recorder 2 connected to the HDMI terminal corresponding to the HDMI 2.

For example, JP-A-2008-35190 has disclosed a video display device in which a user sets whether any of plural types of input terminals can be selected or cannot be selected. According to the device, it is possible to efficiently carry out an operation for selecting the input terminal.

JP-A-2008-35190 has disclosed the operation for selecting the input terminal. However, how to display a name of a connected apparatus on a TV has not been investigated sufficiently.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a device name editing apparatus includes: a connector to which a device is connected; a display unit configured to display a device name of the device; and a device name editor configured to allow a user to input character information so as to edit the device name to be displayed on the display unit.

Figure 1:
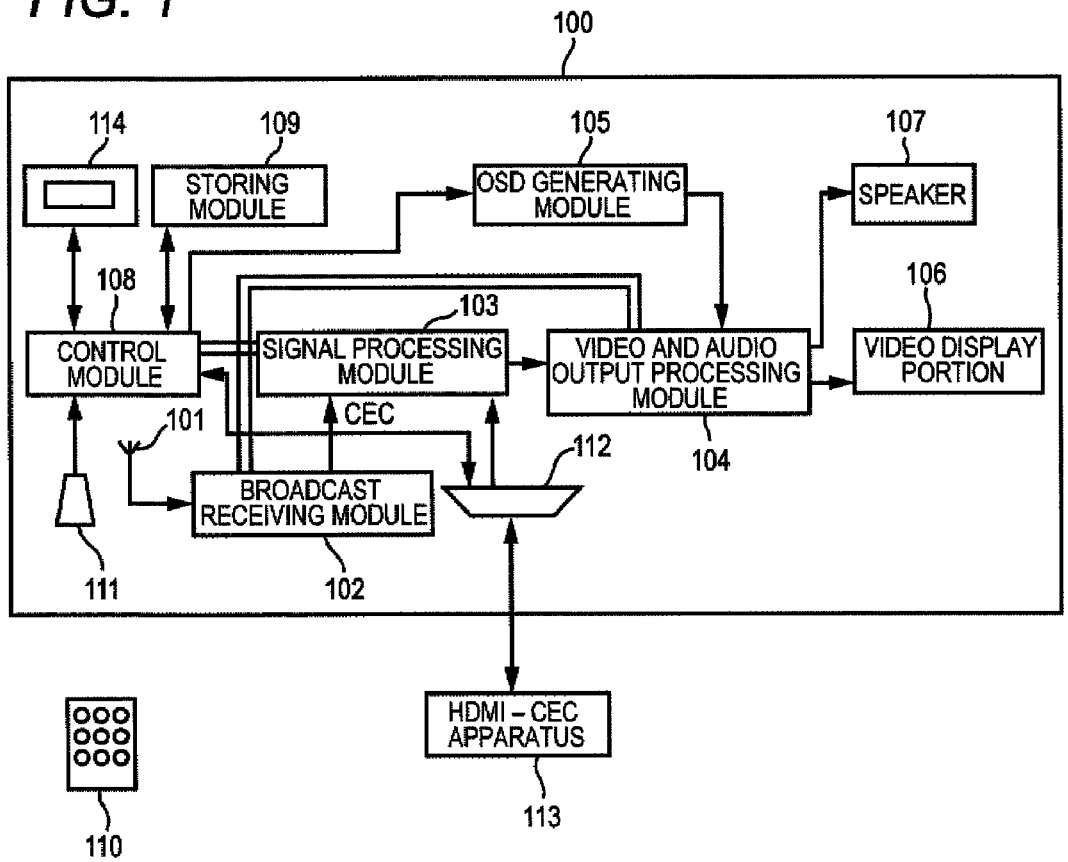
FIG. 1 is a diagram showing a main structure of a television broadcast receiving device according to the embodiment.

FIG. 1 is a diagram showing a schematic structure of a television broadcast receiving device 100 according to an embodiment of the invention. With reference to FIG. 1, description will be given to the television broadcast receiving device 100.

As shown in FIG. 1, a broadcast wave (a broadcasting signal) such as a ground wave or a BS is input to a broadcast receiving module 102 through an antenna 101. The broadcast receiving module 102 includes a so-called tuner and selects any of broadcasting signals having a plurality of channels which has a desirable channel. The broadcasting signal selected by the broadcast receiving module 102 is supplied to a signal processing module 103.

In the signal processing module 103, a demodulation processing or a composite processing is carried out. A predetermined digital signal processing is selectively carried out over a video signal and an audio signal and the signals thus processed are then output to a video and audio output processing module 104 in a subsequent stage.

The video and audio output processing module 104 has a function for superposing an OSD signal generated by an OSD (On Screen Display) generating module 105 on a digital video signal supplied from the signal processing module 103 and outputting a signal thus obtained. The video and audio output processing module 104 can selectively output the output video signal supplied from the signal processing module 103 and the OSD signal supplied from the OD generating module 105 and can also output both of the signals in combination to constitute a half of a screen, respectively.

Moreover, the video and audio output processing module 104 outputs a video signal to a video display portion 106 including a liquid crystal display panel or a plasma panel and displays a video.

Furthermore, the video and audio output processing module 104 converts an input audio signal into an analog audio signal in a format which can be reproduced by a speaker 107 and then outputs the analog audio signal to the speaker 107, and reproduces a voice.

In the television broadcast receiving device 100, all operations including the various receiving operations are generally controlled by a control module 108.

The control module 108 includes a large number of ICs such as a CPU (Central Processing Unit). Moreover, the television broadcast receiving device 100 includes a storing module 109 having an ROM for storing a control program to be executed by the control module 108, an RAM for offering a work area to the CPU, and a nonvolatile memory for storing various set information and control information. An icon 120 which will be described below and information such as a display name of an external apparatus are stored in the storing module 109.

In addition, the television broadcast receiving device 100 includes a remote controller 110 and a code receiving module 111. An operating signal sent from the remote controller 110 (for example, an infrared signal) is received by the code receiving module 111 and is decoded by the control module 108. For example, when an operating signal for a desirable channel selection or desirable external input switching is received by the code receiving module 111, the control module 108 controls each portion such as the signal processing module 103 based on the received operating signal so that a video display or a voice reproduction in a desirable channel is carried out or an external input is switched.

More specifically, for example, the code receiving module 111 receives an input switching signal (a code for giving an instruction for input switching) when a user presses down an input switching button of the remote controller 110. Consequently, an operation menu for switching the external input is displayed. In a state in which the operation menu is displayed, the user can select one of input sources (DTV, ATV, HDMI 1, HDMI 2 and HDMI 3) displayed on the operation menu by operating a ten key or a predetermined button in the remote controller. The external input can also be switched (selected) by using a direction key such as an up-down key in the buttons of the remote controller.

Moreover, the television broadcast receiving device 100 includes an HDMI connecting module 112. Accordingly, the television broadcast receiving device 100 can be connected through the HDMI connecting module 112 to a plurality of apparatuses including an HDMI terminal (for example, a DVD recorder and an AV amplifier). In FIG. 1, the television broadcast receiving device 100 is connected to an HDMI-CEC apparatus 113 through the HDMI connecting module 112. The control module 108 can carry out a two-way communication with the HDMI-CEC apparatus 113 through the HDMI connecting module 112 based on CEC standards. In other words, it is possible to control the HDMI-CEC apparatus 113 by using the remote controller 110 from the television broadcast receiving device 100. If the HDMI-CEC apparatus 113 is a DVD recorder and a control signal (for example, a reproducing, stop or recording signal) for the DVD recorder is received from the remote controller 110, for example, a control signal for giving an instruction for a reproduction or a stop is transmitted to the DVD recorder through an HDMI communication cable. Thus, it is possible to control the reproduction or stop of the DVD recorder.

Moreover, the television broadcast receiving device 100 includes a USB terminal 114. Accordingly, the television broadcast receiving device 100 can be connected to an apparatus including a USB terminal (for example, an external HDD) through the USB terminal 114. The television broadcast receiving device 100 includes an external input terminal (a composite or a component) other than the HDMI terminal or the USB terminal and can also be connected to a plurality of external apparatuses through the external input terminal, which is not shown.

It is also possible to physically connect an external apparatus by a communication cable through the HDMI connecting module 112 or the USB terminal 114 or to connect the external apparatus by wireless through a radio communication. Irrespective of the HDMI or the USB, it is preferable that both of a video and a voice should be collectively transmitted through a predetermined cable as an interface to which the external apparatus is connected. Although the HDMI and the USB will be described in the embodiment, furthermore, other communication standards may be employed.

Figure 2:
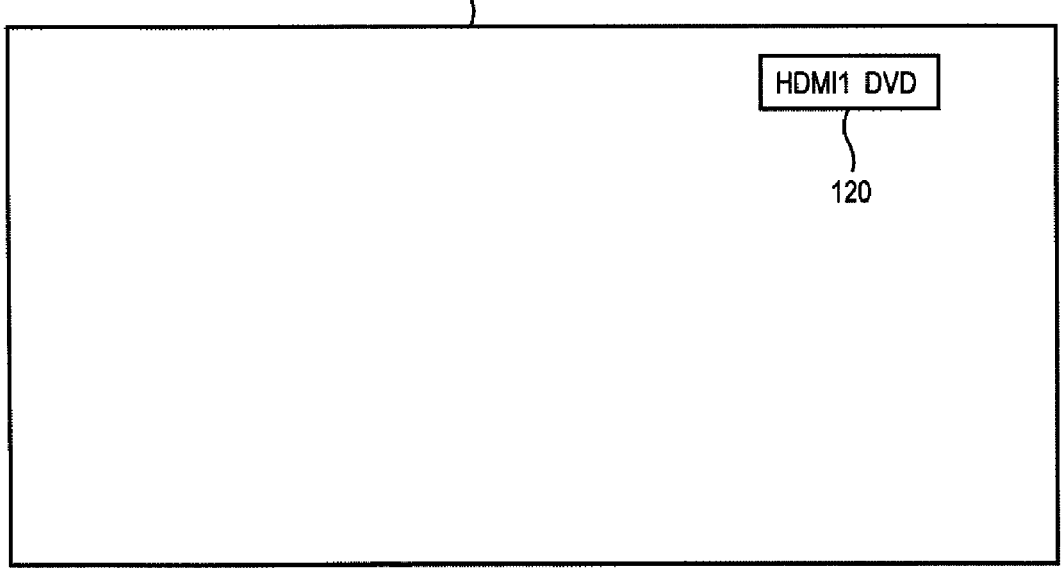
FIG. 2 is a diagram showing a display name of an external apparatus of the television broadcast receiving device according to the embodiment.

Next, description will be given to a display of a name of the external apparatus in the television broadcast receiving device 100 according to the embodiment. FIG. 2 shows an example of a display of the video display portion 106 in the case in which an external input is switched or an icon is displayed by pressing down a so-called "screen display button".

More specifically, when the HDMI 1 is selected as an external input by operating the remote controller 110, the control module 108 controls the signal processing module 103 in such a manner that video and audio signals of an apparatus connected to an input terminal of the HDMI 1 (which is assumed to be the HDMI-CEC apparatus 113) are output from the video and audio output processing module 104. A video output from the HDMI-CEC apparatus 113 is displayed on the video display portion 106, and furthermore, the icon 120 is displayed on a right upper part of a screen.

The icon 120 includes a name (an HDMI 1 in FIG. 2) of an external input (an input terminal) and a name (a DVD in FIG. 2) indicative of an apparatus connected to the external input. According to the structure, it is possible to recognize a fact that a video is switched into an apparatus connected to the HDMI 1 and a type of the apparatus (the DVD recorder in FIG. 2) by referring to the icon 120 when carrying out the switching into the external input. Moreover, the icon 120 may include graphics (for example, a logo mark) as well as characters.

In the embodiment, there is employed the structure in which contents included in the icon 120 displayed in the execution of the input switching are selected from a plurality of choices or can be changed by inputting a character as shown in FIG. 2. How to change the display name of the apparatus will be described with reference to FIG. 3.

Figure 3:
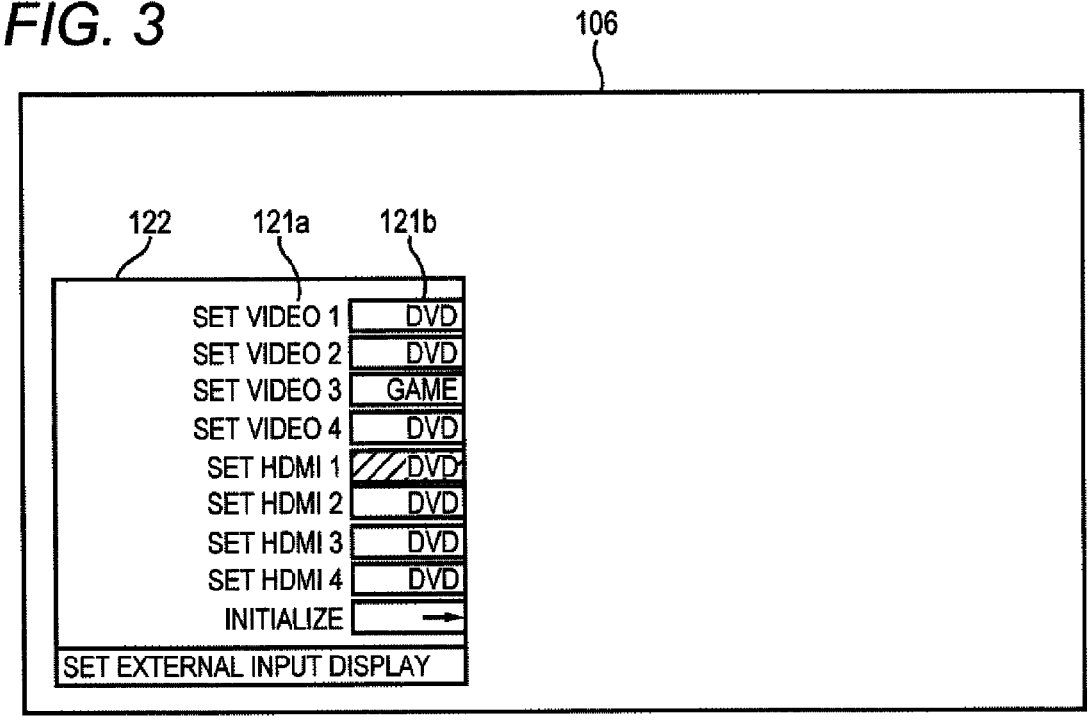
FIG. 3 is a diagram showing an external input display setting menu according to the embodiment.

First of all, as shown in FIG. 3, an external input display setting menu 122 for correspondingly displaying an external input name 121*a* and an apparatus name (a display name) 121*b* displayed in an execution of switching into the external input is displayed on the video display portion 106. More specifically, for example, the external input display setting menu 122 is displayed by carrying out an operation for selecting a menu of "external input display set" from a menu of "external input set" menu through the remote controller 110. An external input to be set can be selected by an up-down cursor operation and the selected external input (the HDMI 1 in FIG. 3) is highlighted.

Figure 4:
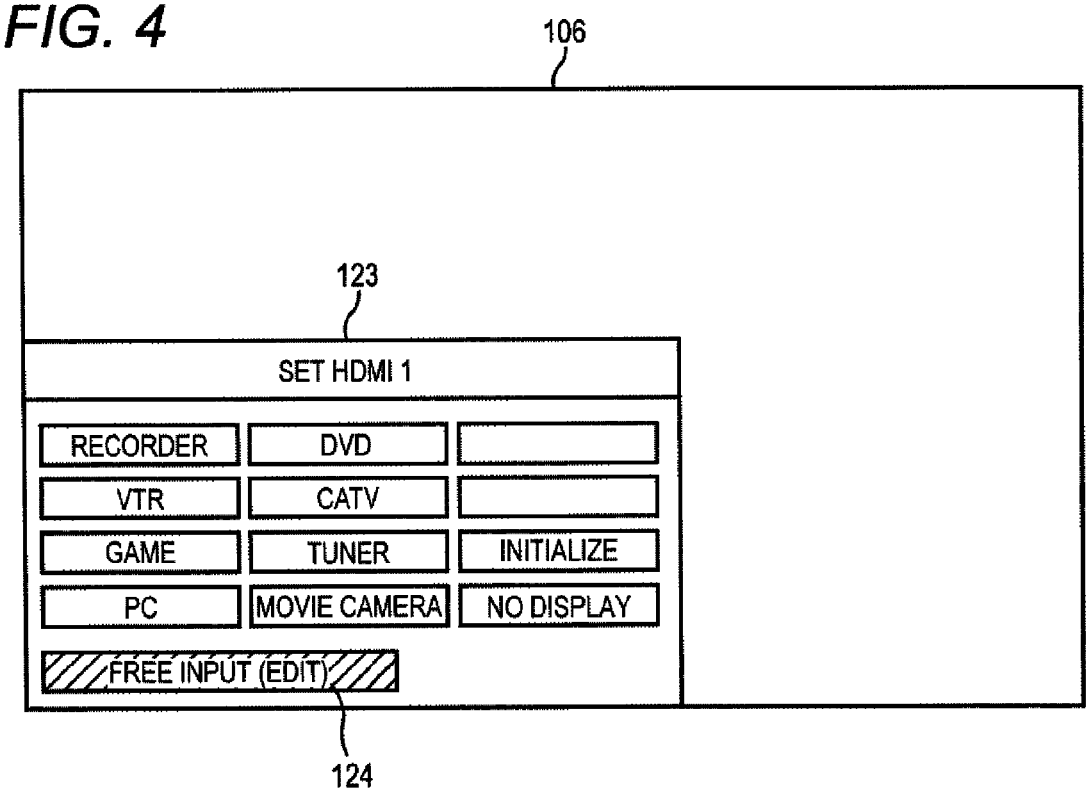
FIG. 4 is a diagram showing an apparatus display name selecting menu according to the embodiment.

Next, a display name is changed. More specifically, when the HDMI 1 is selected as the external input to be set in FIG. 3 and a determination key is pressed down, an apparatus display name selecting menu 123 is displayed as shown in FIG. 4. The apparatus display name selecting menu 123 according to the embodiment includes a plurality of selection items such as "recorder", "DVD", "VTR", "CATV", "game", "tuner", "PC (personal computer)", "movie camera", "initialize" and "no display" as shown in FIG. 4. For example, in the case in which the "DVD" is selected and determined, the icon 120 shown in FIG. 2 is displayed.

The embodiment has a feature that the apparatus display name selecting menu 123 includes an item 124 of "free input (edit)". In the case in which the "free input" is selected to carry out a determining operation, the user can freely edit the display name. More specifically, for example, when the item 124 of the "free input (edit)" is selected and the determination key of the remote controller 110 is pressed down in FIG. 4, a free input screen 125 is displayed as shown in FIG. 5.

Figure 5:
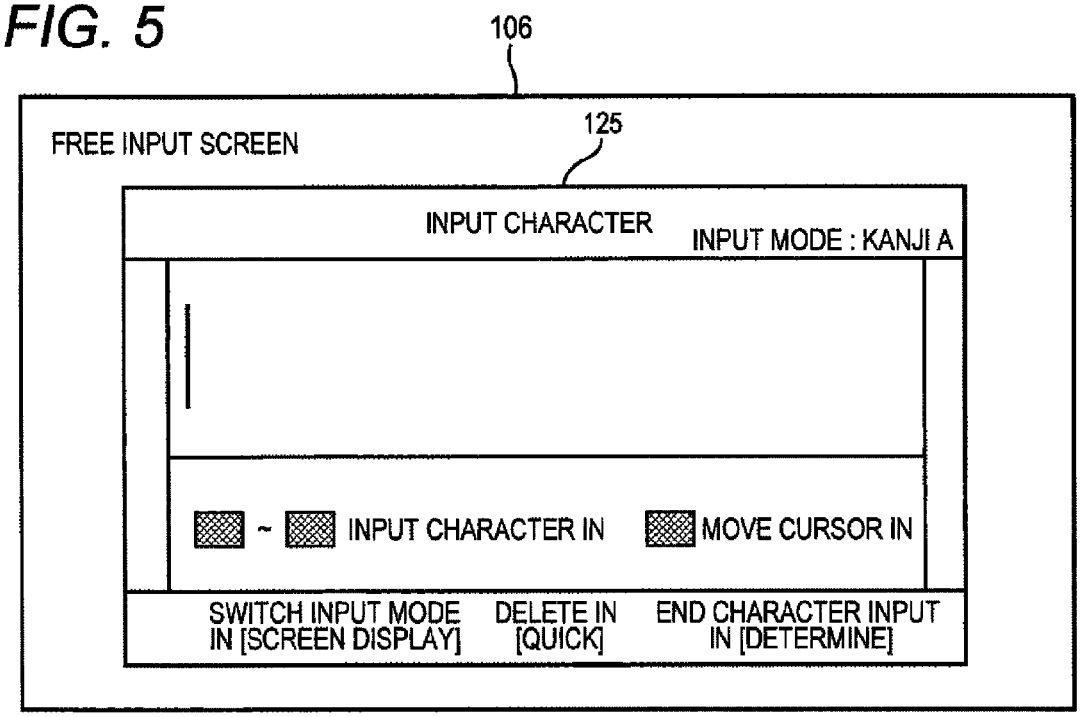
FIG. 5 is a diagram showing a free input screen according to the embodiment.

In the embodiment, as shown in FIG. 5, the control module 108 is constituted in such a manner that a character can be input by a button (1 to 12 or a cursor movement) operation included in the remote controller 110. More specifically, the television broadcast receiving device 100 can also include a character input module, which is not shown. For example, when the button 1 of the remote controller 110 is pressed down once, a right cursor operation is carried out and the button 1 is pressed down twice, "AI" is input. For an input mode, it is possible to employ well-known character input modes used in a portable telephone or a PC, for example, a "kanji converting mode", a "full size kana mode", a "full size alphabet mode", a "half size alphabet mode", a "full size numeral mode", a "half size numeral mode", a "full size symbol mode" and a "half size symbol mode". The control module 108 may be constituted in such a manner that a predetermined number of characters or less can be edited as the display name. In other words, it is also possible to have such a structure that an error is set if a free input name has a number of characters which exceeds a limited number of characters, and the free input is promoted again.

Figure 6:
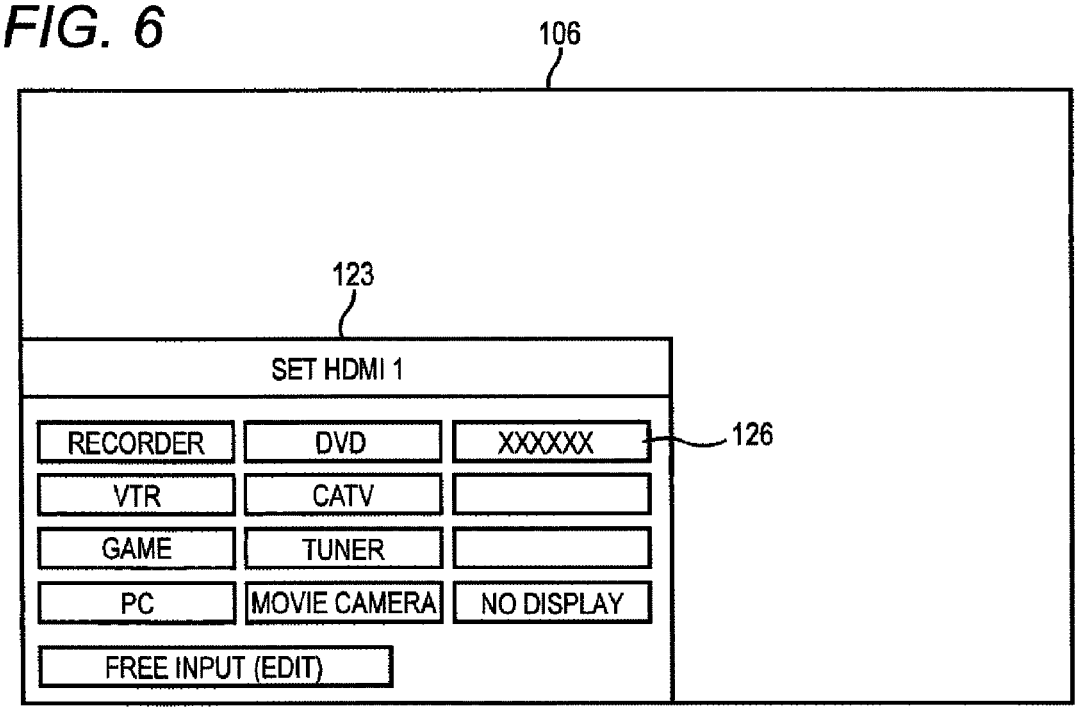
FIG. 6 is a diagram showing an apparatus display name selecting menu according to the embodiment.
Figure 7:
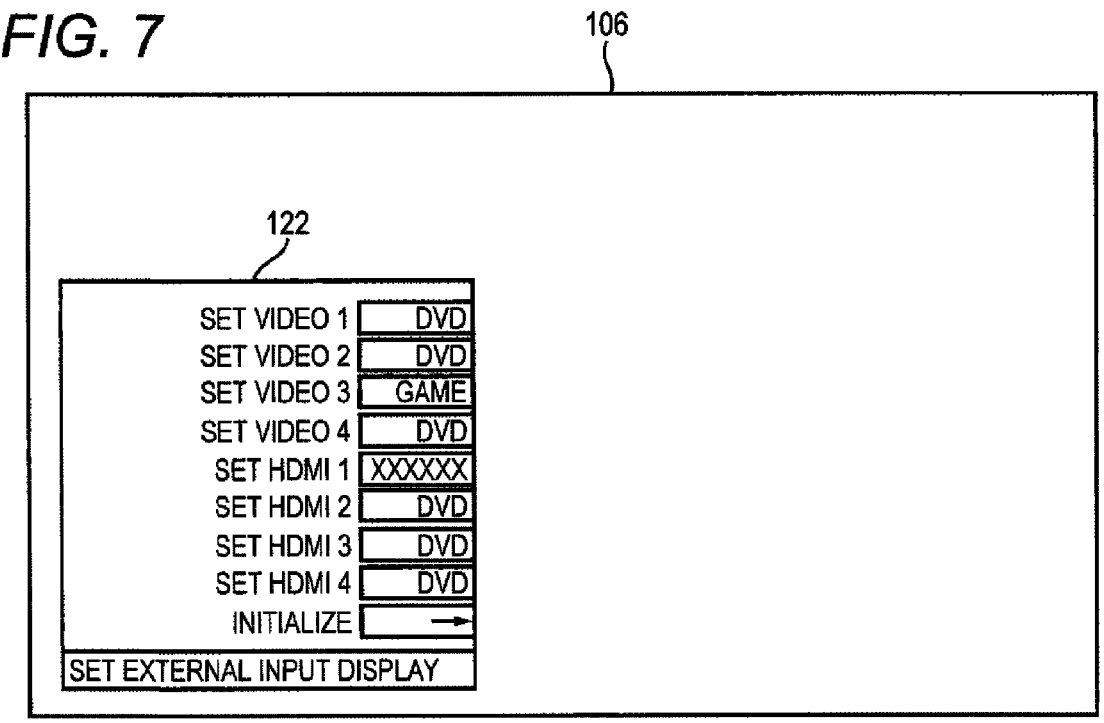
FIG. 7 is a diagram showing the apparatus display name selecting menu according to the embodiment.
Figure 8:
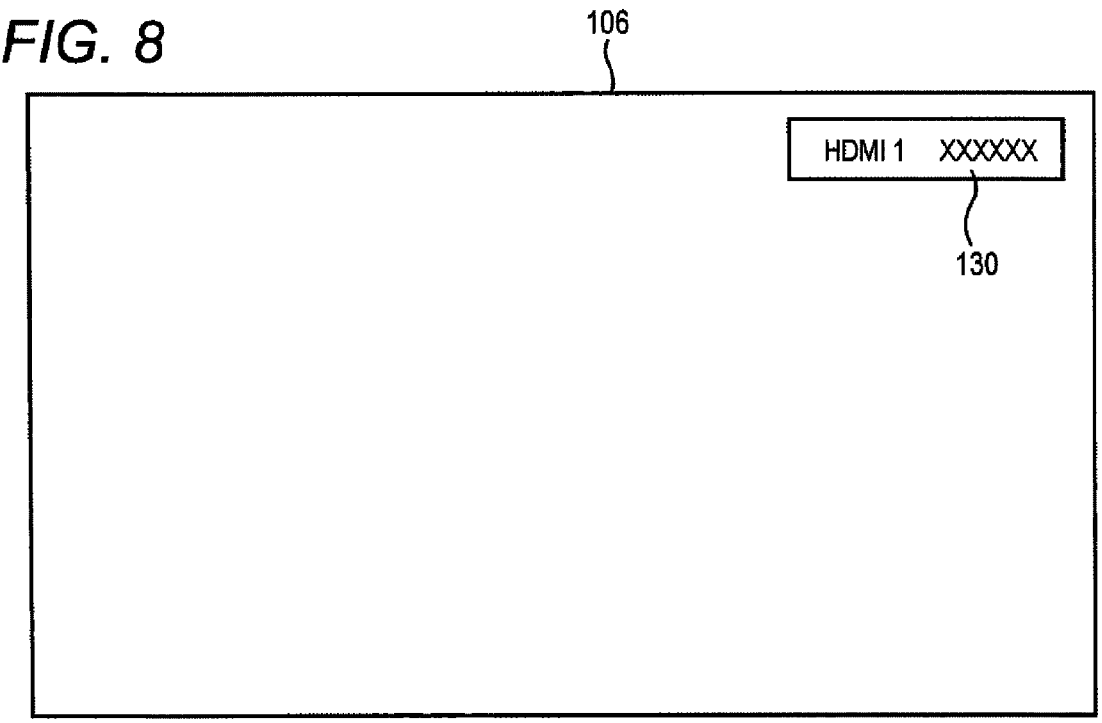
FIG. 8 is a diagram showing a display name of an external apparatus of the television broadcast receiving device according to the embodiment.

When a character of "XXXXXX" is input to the HDMI 1 and a determining operation is carried out, data on an input display name are stored in the storing module 109. As shown in FIG. 6, then, an item 126 of the apparatus display name selecting menu 122 is represented as "XXXXXX" for an input name. When a user selects "XXXXXX" to carry out a determining operation over the screen, a result of the edit is reflected on the external input display setting menu 122 as shown in FIG. 7. When the external input is switched or the screen displaying operation is carried out, an icon 130 reflecting the contents of the free input shown in FIG. 8 is displayed on the video display portion 106.

Figure 9:
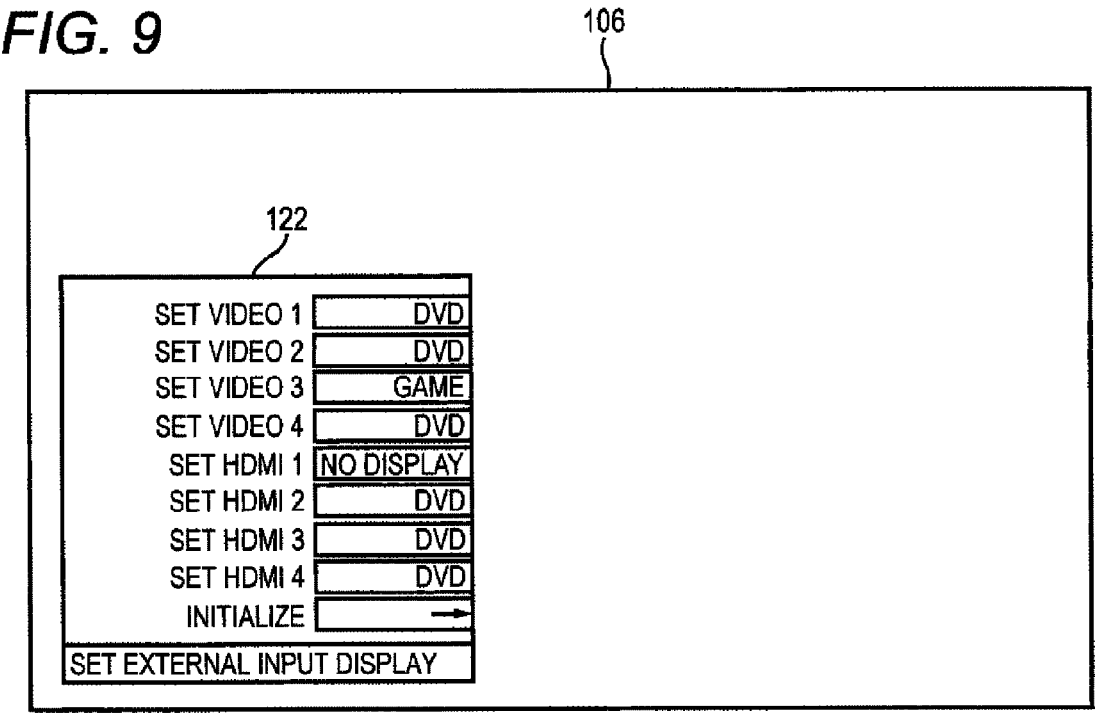
FIG. 9 is a diagram showing the apparatus display name selecting menu according to the embodiment.

In the case in which "no display" is selected for the HDMI 1 to carry out a determining operation in FIG. 6, "no display" is displayed for HDMI 1 set of the external input display setting menu 122 shown in FIG. 9, for example. In this case, although an icon is displayed on the video display portion 106 when the external input is switched or the screen display operation is carried out, an apparatus name such as DVD is not displayed.

As described above, in the first embodiment, the apparatus display name selecting menu has an item of "free input (edit)". Therefore, it is possible to freely set a display name of an apparatus other than the choices. Thus, it is possible to enhance a convenience of the user.

Next, a second embodiment according to the invention will be described. Description of the same structures as those of the first embodiment will be omitted or summarized. The second embodiment has a main feature that apparatus information such as a display name registered by a user in the past or an apparatus name acquired through a communication such as HDMI-CEC or i-link are utilized in the "free input (edit)".

Figure 10:
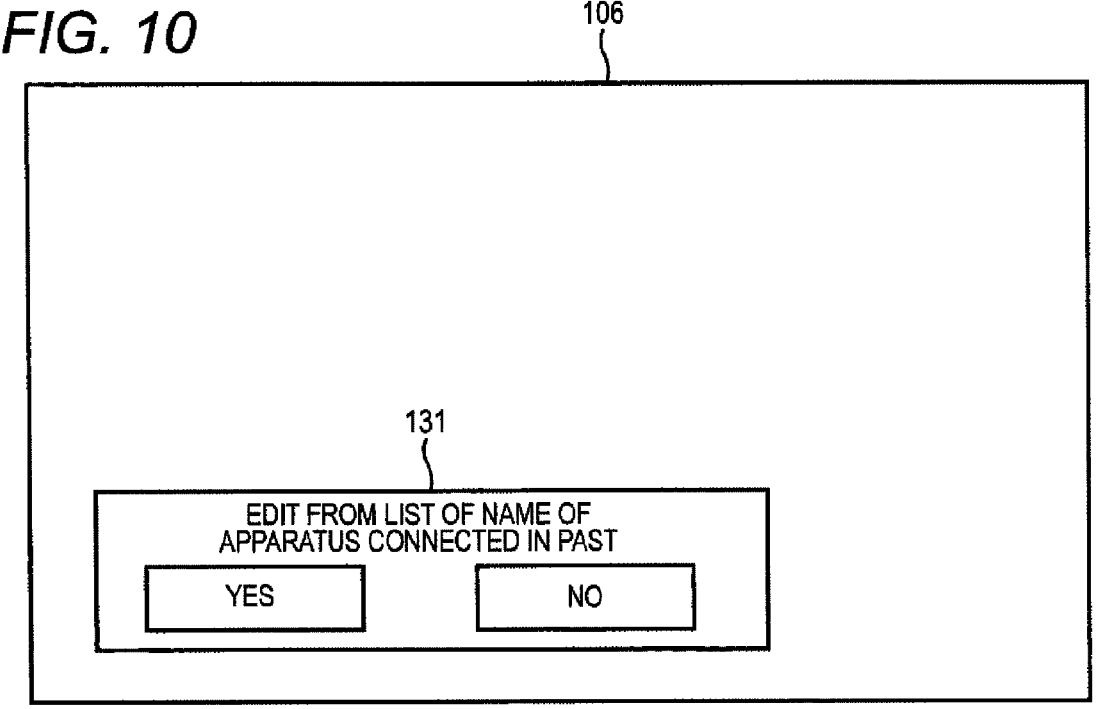
FIG. 10 is a diagram showing a selecting menu indicating whether or not a display name registered in the past is utilized to carry out an edit according to the embodiment.

For example, in the case in which a display name registered in the past through a free input is recorded in a storing module 109, the item 124 of "free input" described with reference to FIG. 4 is selected and a determination key is pressed down so that a control is carried out by a control module 108 to display a selecting menu 131 indicating whether the display name registered in the past is utilized or not as shown in FIG. 10.

Figure 11:
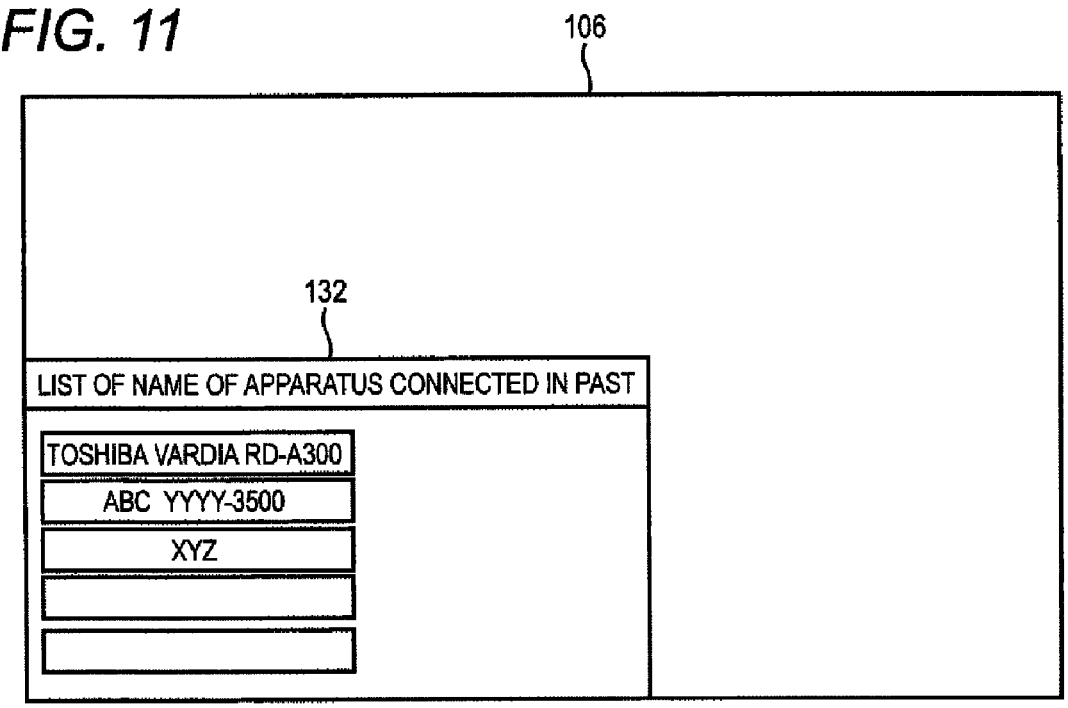
FIG. 11 is a diagram showing a list of a display name of an apparatus which was registered in the past according to the embodiment.

If "Yes" is selected, a list 132 of a display name of a connected apparatus registered in the past is displayed as shown in FIG. 11, for example. When any of the display names is selected, a transition to a free input screen in FIG. 5 is carried out in a state in which the display name is input. If it is decided that the exact state may be maintained, a determining operation is carried out. If an edit is to be further carried out, the determining operation is executed after the edit. If "No" is selected, a transition to the free input screen of FIG. 5 (an input column is empty) is carried out.

Moreover, it is also possible to connect an apparatus such as an HDMI-CEC apparatus or an i-Link apparatus to a TV and to acquire apparatus information (a manufacturer name, a model name or a manufacturing date) including a name of an apparatus connected automatically through a digital communication. The i-Link is a digital interface capable of transmitting video, audio and control signals through a single cable at a high speed in a two-way direction in the same manner as the i-Link. In the case in which the HDMI-CEC apparatus is connected, it is also possible to acquire the name of the HDMI-CEC apparatus which is further connected to the apparatus. Thus, the television broadcast receiving device 100 includes apparatus information automatic acquiring means for carrying out a predetermined communication with an external apparatus, thereby acquiring apparatus information transmitted from the external apparatus. There are various specific methods of acquiring the apparatus information, and the control module 108 automatically detects that an external apparatus is connected to connecting means (for example, an HDMI connecting module or a USB terminal 114 in FIG. 1) and can acquire apparatus information such as an apparatus name by transmitting, to the external apparatus, a command for acquiring apparatus information from the external apparatus by setting the detection as a trigger. The apparatus information is not restricted to data of a name but graphic data (for example, an icon or a logo which indicates the apparatus). Although the apparatus information is received based on CEC standards in the embodiment, the other communication standards may be employed.

In the case in which the apparatus information automatic acquiring means is provided, it is preferable that the acquired information should be recorded in the storing module 109 and should be added to the list 132 of the display name of the apparatus registered in the past as described with reference to FIG. 11. For example, in the case in which an AV amplifier is connected and a plurality of HDMI-CEC apparatuses are further connected in a previous stage to the AV amplifier, a combination of a name of the AV amplifier and names of the HDMI-CEC apparatuses may be registered. More specifically, if the AV amplifier (a name: AV 1) and two HDMI-CEC apparatuses (DVD 1 and DVD 2) are connected to each other, it is also possible to simultaneously register names of six types in total, that is, AV 1, DVD 1, DVD 2, AV 1 DVD 1, AV 1 DVD 2, and AV 1 DVD 1 DVD 2 as the apparatus name.

According to the structure, the user can easily carry out the edit and can also perform the edit through only a deletion without requiring to execute an input.

As described above, in the second embodiment, apparatus information such as the display name registered in the past and the apparatus name acquired through a communication, for example, HDMI-CEC or i-Link is utilized in the "free input (edit)". In the embodiment, the acquired apparatus information is previously input to an editing menu of the "free input". Therefore, the user can easily carry out an editing work and it is possible to further enhance the convenience of the user in addition to the advantages obtained in the first embodiment.

Figure 12:
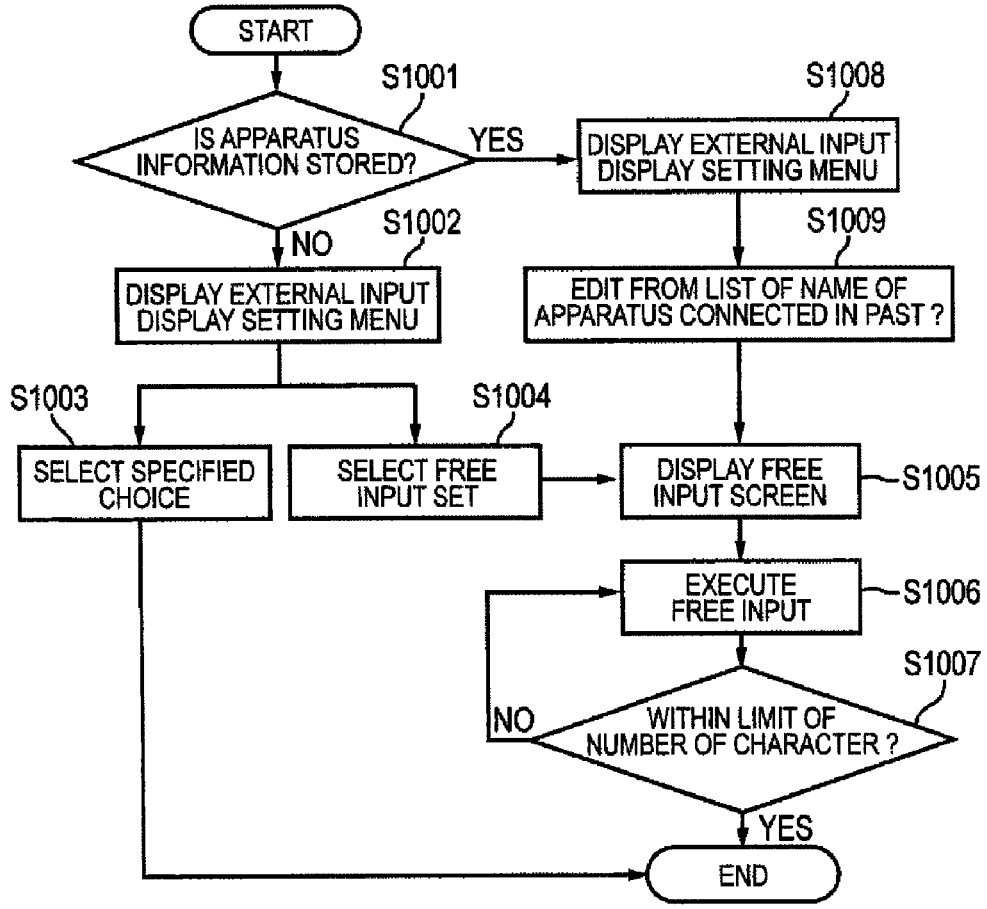
FIG. 12 is a flowchart showing a free inputting operation of the television broadcast receiving device according to the embodiment.

Next, a summary of the free input operation of the television broadcast receiving device 100 according to the first and second embodiments will be described with reference to a flowchart of FIG. 12.

First of all, if apparatus information such as an apparatus name is not recorded, for example, the free input has not been carried out (No in Step 1001), the external input display setting menu 122 is displayed as described with reference to FIG. 3 corresponding to a user operation (Step 1002).

When an external input to be set is selected, next, the apparatus display name selecting menu 123 is displayed as shown in FIG. 4. If a specified choice is selected from the apparatus display name selecting menu 123 (Step 1003), the icon shown in FIG. 2 is displayed corresponding to the selected item. If a choice of the free input is selected from the apparatus display name selecting menu 123 (Step 1004), moreover, the free input screen 125 is displayed as shown in FIG. 5 (Step 1005).

When a character is input to carry out a determining operation (Step 1006), subsequently, it is decided whether the number of the input characters ranges within a limit or not (Step 1007). If the number of the characters does not range within the limit, the free input is executed again. If the number of the characters ranges within the limit, data on the display name are stored in the storing module 109 and the input name is input to one of the items in the apparatus display name selecting menu 122 as shown in FIG. 6. When the item input freely is selected to carry out the determining operation through the apparatus display name selecting menu 122r then, a result of the edit is reflected on the external input display setting menu 122. When an external input is switched or a screen displaying operation is carried out, thereafter, the icon is displayed with the freely input contents on the video display portion 106.

If the apparatus information is recorded in the storing module 109, for example, the free input has been carried out or apparatus information has been acquired through a predetermined communication (Yes in Step 1001), the external input display setting menu 122 is displayed as described with reference to FIG. 3 corresponding to a user operation (Step 1008).

When an external input to be set is selected, subsequently, the apparatus display name selecting menu 123 is displayed as shown in FIG. 4. If the choice of the free input is selected from the apparatus display name selecting menu 123, next, the selecting menu 131 indicating whether the display name registered in the past is utilized to carry out an edit or not as shown in FIG. 10 (Step 1009).

If "Yes" is selected, the list of the display name of the apparatus registered in the past is displayed as shown in FIG. 11, for example. When any of the display names is selected, then, a transition to the free input screen shown in FIG. 5 is carried out in a state in which the display name is input (Step 1005). If "No" is selected, moreover, a transition to the free input screen in FIG. 5 (an input column is empty) is carried out.

As described above, in the first and second embodiments, it is possible to freely edit the display name of the external apparatus through the free input (edit). Therefore, it is possible to enhance the convenience of the user.

The invention is not exactly restricted to the embodiments but the components can be changed to be concrete without departing from the scope thereof in an executing stage. By a proper combination of the components disclosed in the embodiments, moreover, it is possible to form various inventions.

As described with reference to the embodiment, there is provided a device name editing apparatus and a device name display method which can display a name of an apparatus connected more effectively in consideration of a convenience for a user.

According to the embodiment, there is provided the apparatus display name editing means for permitting a user to edit a display name of a connected apparatus. According to the invention, therefore, it is possible to enhance a convenience for the user, thereby displaying a name of the connected apparatus more effectively.

What is claimed is:

1. A connected device display name editing apparatus comprising:
   a connection module to which a device is connectable based on a High-Definition Multimedia Interface (HDMI) standard;
   a device information acquisition module configured to acquire, in accordance with a Consumer Electronics Control (CEC) standard, a display name of the device connected through the connection module;
   a storage module configured to store a plurality of display names, including
      the display name acquired by the device information acquisition module for the device that has been connected at least once to the connection module, and
      the display name registered by a user for the device;
   a device name display module configured to output the display name of the device; and
   a device name editing module configured to allow the user to change the display name of the device through a character input, while displaying a list of the plurality of display names of the devices stored in the storage module and allowing the user to selectively utilize the display names included in the list being displayed, to thereby allow the user to change the display name of the device.

2. The apparatus of claim 1,
   wherein the device name editing module allows the user to select whether the list of the display names of the devices stored in the storage module should be utilized or not.

3. The apparatus of claim 2,
   wherein the device name editing module,
      when the user utilizes the list of the display names of the devices stored in the storage module, allows the user to change the display name of the device through the character input, while displaying the list of the display names of the devices stored in the storage module so that the display names of the devices being displayed are utilized, and
      when the user does not utilize the list of the display names of the devices stored in the storage module, allows the user to change the display name of the device through the character input, without displaying the list of the display names of the devices stored in the storage module.

4. The apparatus of claim 1,
wherein the display name of the device is a device name which is displayed at least upon an external input switching operation.

5. The apparatus of claim 1,
wherein the device name display module outputs the display name of the device upon an external input switching operation.

6. The apparatus of claim 1, further comprising:
a tuner module configured to receive a broadcast wave.

7. A connected device display name editing method, using a connected device display name editing apparatus that comprises a connection module to which a device is connectable based on a High-Definition Multimedia Interface (HDMI) standard, a device information acquisition module configured to acquire a display name of the device connected through the connection module, a storage module configured to store, in a plurality, the display name of the device, a device name editing module configured to allow the user to change the display name of the device, and a device name display module configured to output the display name of the device, the method comprising:

storing, by the storage module, a plurality of display names, including
the display name acquired, in accordance with a Consumer Electronics Control (CEC) standard, by the device information acquisition module for the device which has been connected in accordance with the HDMI standard at least once to the connection module, and
the display name registered by a user for the device;

allowing, by the device name editing module, the user to change the display name of the device through a character input, while displaying a list of the plurality of display names of the devices being stored so that the display names included in the list being displayed are selectively utilized, to thereby change the display name of the device; and outputting, by the device name display module, the display name of the device having been changed.

* * * * *